United States Patent Office 3,331,630
Patented July 18, 1967

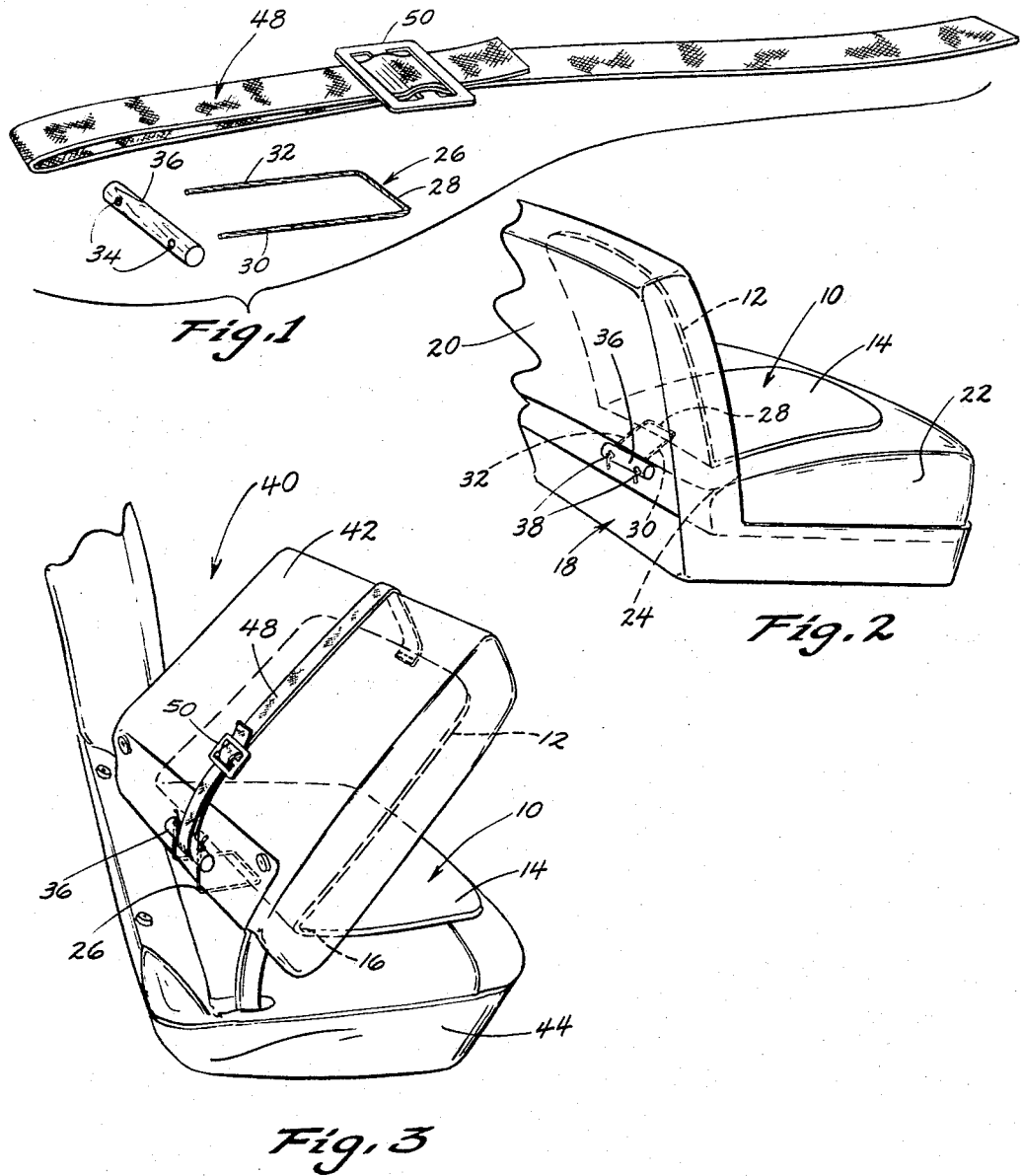

3,331,630
SEAT CUSHION
Ralph Harsh, 905 Bryan, Adel, Iowa 50003
Filed Oct. 19, 1965, Ser. No. 497,766
9 Claims. (Cl. 297—231)

This invention relates to a seat cushion and in particular to a seat cushion having an anchor for securing it to a seat.

It is a common practice to place an additional cushion on top of the seat in an automobile. These cushions serve to insulate the passenger from heat in the summer and cold in the winter. Typically, the cushion will be formed from coil spring material thereby providing an air space between the seat and the outer surface of the cushion.

A vexing problem with these car cushions is that they are hard to hold in place particularly when a passenger is entering or leaving the automobile. Also, the cushions are dislocated in a two door automobile when the front seat is folded forward. The back section of the cushion will fall down on to the seat section of the car cushion. At the same time, the entire cushion will be moved out of place on the car seat.

Therefore, it is one of the principal objects of this invention to provide a cushion for a seat that may be readily anchored to the seat.

Another object of this invention is to provide a cushion for a seat wherein an anchor member is provided which is adapted to be detachably connected to the seat along the mating adjacent edges of the back seat portion and the seat cushion portion.

A still further object of this invention is to provide a cushion for a seat wherein the cushion has an anchor means which is adapted to be yieldably anchored to the seat.

A still further object of this invention is to provide a cushion having an anchor means which is particularly well suited for being secured to the back seat portion.

A still further object of this invention is to provide a cushion having an anchor means and an adjustable tie means for encircling the back seat portion.

A further object of this invention is to provide a seat cushion which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspecive view of the components employed to secure the cushion to the seat;

FIG. 2 is a fragmentary end perspective view of a car seat illustrating the cushion held in place by the anchor member; and FIG. 3 is a view similar to FIG. 2 but showing a modified version of the car cushion of FIG. 2 which is particularly well suited for the seat having a back portion adapted to pivot forwardly.

The cushion of this invention is referred to generally in FIG. 3 by the reference numeral 10 and includes a back section 12 and a seat section 14 with are pivotally connected together along an axis 16. The cushion may be formed of coil spring material.

In FIG. 2 a seat 18 is illustrated which includes rigidly interconnected back end seat portions 20 and 22 respectively. The inner ends of the back and seat portions 20 and 22 meet in mating engagement at 24. A length of cord 26 is provided which has an intermediate portion 28 extending along the pivotal axis of the cushion 10 and a pair of end portions 30 and 32 which extend through the cushion 10 on its pivotal axis. The ends 30 and 32 extend through bores 34 formed in an anchor member 36. The ends 30 and 32 are secured in the bores 34 by knots 38 tied in the cord on the outer side of the anchor member 36. The anchor member 36 is elongated and circular in cross-section.

In use then it is seen that the appropriate length of cord is selected which will place the anchor member 36 sufficiently far enough away from the cushion 10 such that the anchor member 36 may be pushed down and between the adjacent mating edges at 24 as shown in FIG. 2. The cushions 20 and 22 being formed of resilient material are depressed to permit the anchor member 36 to be pushed therebetween to the back side thereof. Accordingly, the cushion 10 is yieldably held in place and if necessary the cushion may be tightened down by pulling tight the cord ends 30 and 32.

In FIG. 3 a seat 40 is shown which includes a back portion 42 which is pivotally connected to a seat portion 44. This type of seat is normally found in a two door automobile wherein the back portion 42 is required to pivot forwardly to permit occupants to enter the back seat of the car. To hold the anchor member 36 in the desired position when the back seat portion 42 is pivoted forwardly as shown in FIG. 3, a tie strap 48 is provided which embraces the anchor member 36 and is secured at its opposite end to the upper or top edge of the back section 12 of the cushion 10. A buckle 50 is provided to permit adjustment of the tie strap 48 to the desired position. The end of the strap opposite the anchor member 36 may be sewn if desired to the cushion back section 12.

Thus, it is readily apparent that the cushion 10 is positively held in place on the seat 40 even when the back portion 42 is pivoted forwardly onto the seat portion 44.

Some changes may be made in the construction and arrangement of my seat cushion without departing from the real spirit and purpose of my invention, and it is my intention to cover by my claims, any modified forms of structure or use of mechanical equivalents which may be reasonably included within their scope.

I claim:
1. In combination,
a seat having a back seat portion and a seat cushion portion,
a seat cushion positioned on said seat, said seat cushion having a back section and a cushion section for mating engagement with the back seat portion and the seat cushion portion of said seat, said sections being pivotally connected together,
an anchor member secured to said seat cushion and disposed between adjacent edges of said back seat portion and said seat cushion portion to hold said seat cushion in place,
and cord means having an intermediate portion disposed on the front side of said sections along said pivotal axis and free end portions extending through said sections along said pivotal axis and secured to opposite ends of said anchor member, a knot formed in each free end portion, means on said anchor for engaging each knot whereby said knotted free end portions may be selectively varied in length to be only enough to hold said anchor member tightly to said seat cushion.

2. The structure of claim 1 wherein said adjacent edges of said back seat portion and said seat cushion portion are formed of resilient material and are normally in mating contact with each other, and said anchor member having a suitable size to be positioned between said adjacent edges and to be yieldingly limited against removal.

3. The structure of claim 1 wherein said anchor member is circular in cross-section and said knot engaging means comprises bores extending through opposite ends, said cord free ends extending through said bores and said knots holding said ends in said bores.

4. The structure of claim 1 and a tie means is secured at one end to said anchor member and at the other end to the top edge of said seat cushion, said tie means extending along the back side of said back seat portion.

5. The structure of claim 4 wherein said tie means is a strap and said strap is adjustably connected to said anchor member.

6. The structure of claim 4 wherein said back seat portion is pivotally connected to said seat cushion portion whereby when said back seat portion is pivoted towards said seat cushion a portion of said anchor member is exposed.

7. A seat cushion, comprising,
   a back seat section and seat cushion section, said sections being pivotally connected together, said sections having front and back sides,
   an anchor member,
   cord means connected to said sections substantially on the pivotal axis between said sections, said cord means extending from said back sides of said sections and connected to said anchor member,
   said cord means having an intermediate portion disposed on the front side of said sections along said pivotal axis and the free end portions extending through said sections along said pivotal axis and secured to opposite ends of said anchor member, a knot formed in each free end portion, means on said anchor for engaging each knot whereby said knotted free end portions may be selectively varied in length to be only long enough to hold said anchor member tightly to said seat cushion when mounted on a seat.

8. The structure of claim 7 wherein said anchor member is circular in cross-section and said knot engaging means comprises bores extending through opposite ends, said cord free ends extending through said bores and said knots holding said ends in said bores.

9. The structure of claim 7 and an adjustable in length tie means is secured to said anchor member and to tie the upper end of said back cushion section and said back section, said cord means, said anchor member and said tie means adapted to extend around the back seat portion of a seat.

References Cited

UNITED STATES PATENTS

| | | | |
|---|---|---|---|
| 1,422,908 | 7/1922 | Wittcoff | 297—229 |
| 1,954,376 | 4/1934 | Brueckl | 297—253 |
| 2,804,913 | 9/1957 | Pickard | 297—382 |
| 2,812,804 | 11/1957 | Sandor | 297—284 |
| 2,831,530 | 4/1958 | Chiopelas et al. | 297—397 |
| 2,848,036 | 8/1958 | Campbell | 297—253 |
| 2,944,591 | 7/1960 | Merrill | 297—253 |
| 3,172,702 | 3/1965 | Rose | 297—230 |

FOREIGN PATENTS

| | | | |
|---|---|---|---|
| 850,372 | 9/1939 | France | 297—231 |

FRANCIS K. ZUGEL, *Primary Examiner.*